Jan. 12, 1932.  H. PETERSEN  1,841,206
CULTIVATOR
Filed Jan. 26, 1929  3 Sheets-Sheet 2
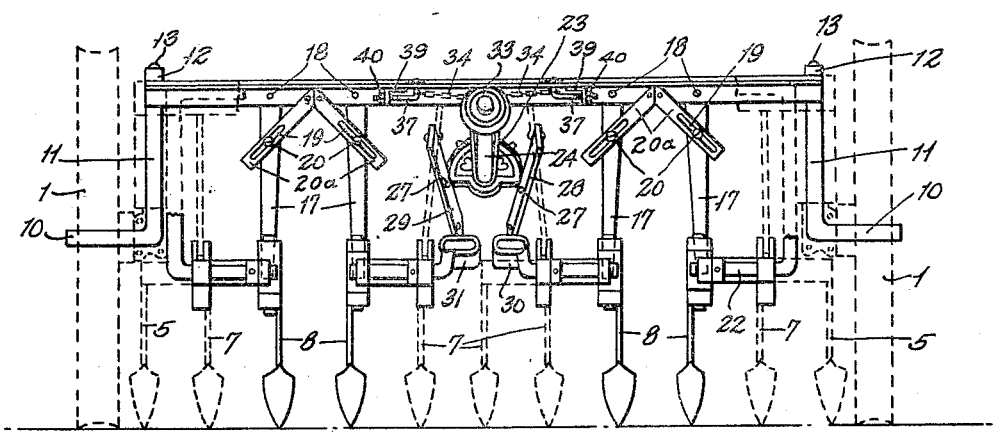
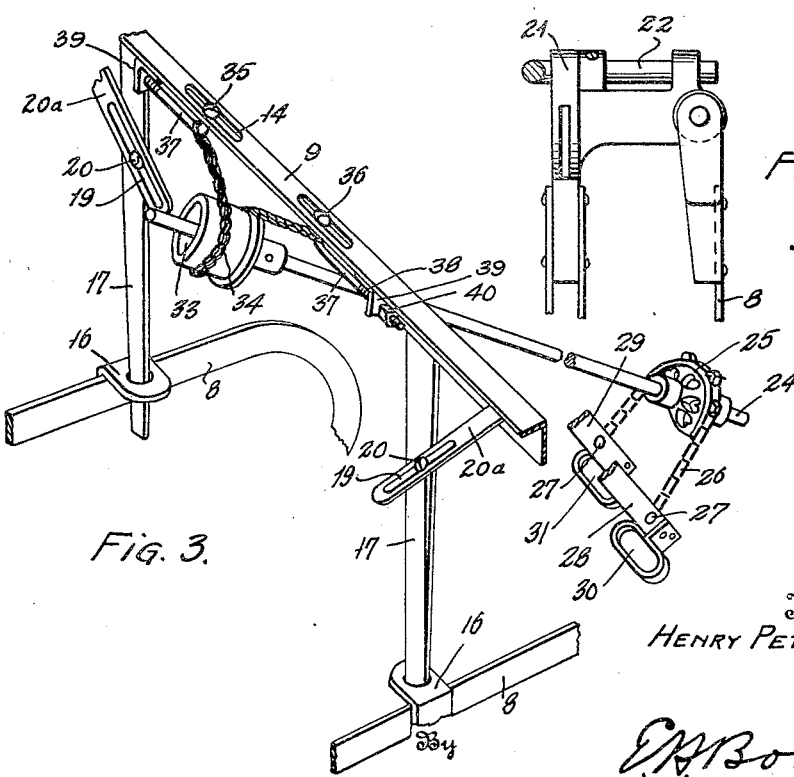
Inventor
HENRY PETERSEN.
By E.H.Bond
Attorney Patented Jan. 12, 1932

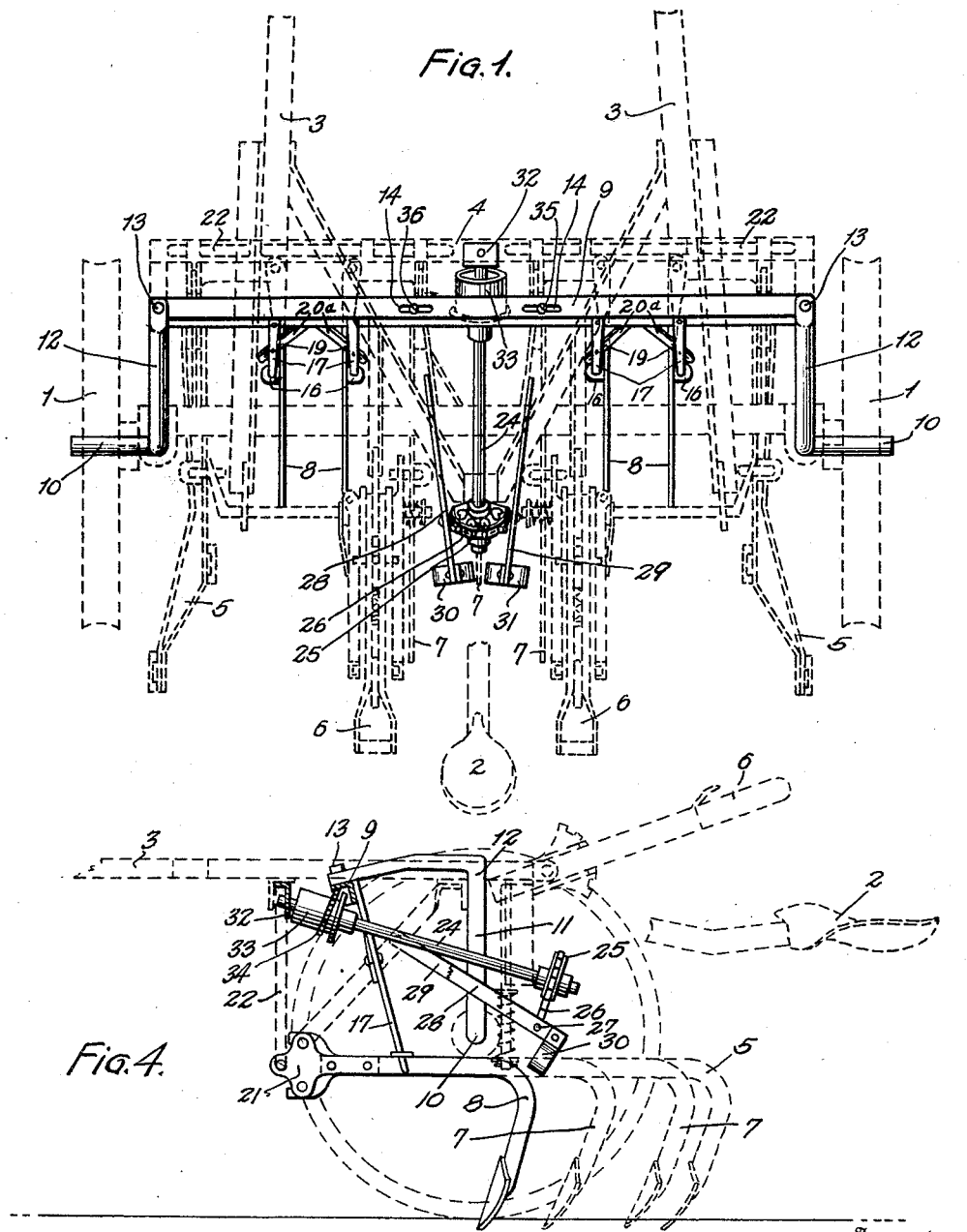

1,841,206

UNITED STATES PATENT OFFICE

HENRY PETERSEN, OF MOUNT AUBURN, IOWA

CULTIVATOR

Application filed January 26, 1929. Serial No. 335,295.

This invention relates to certain new and useful improvements in cultivators, and it has for its objects, among others, primarily to provide simple and efficient durable means whereby the driver may readily shift the traction wheels and the cultivator beams laterally as may be desired. This movement is simultaneous, the movable beams being movable relative to the intermediate and outer fixed beams, and the wheels move in unison therewith by connections which insure proper relation between the parts.

It has for a further object to provide an improved device of this general character whereby better results are more readily obtained, the construction and arrangement being such that one can readily operate in crooked rows or hills of corn or other plants. The structure is such that quick change of the course of travel of the beams may be obtained without undue exertion and the cultivator quickly shifted, so as to cultivate plants that are disposed in straight rows, without injury to the plants and without exertion on the part of the operator.

The invention has for a further object to provide simple yet efficient mountings and connections for the movable beams and the operating mechanism so as to lessen the exertion necessary to readily throw the parts into desired position and, at the same time materially lessen the weight of the cultivator, or its movable parts, the movable beams moving relative to the outer and intermediate beams, thus requiring less power to operate the same. As the movable beams are shifted and the wheels shifted simultaneously therewith, the relatively fixed beams follow the angle or inclination assumed by the wheels, and thus the outer beams automatically follow the inclination or angle followed by the wheels.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this invention, and in which Fig. 1 is a top plan view of a cultivator, the parts constituting the present invention being shown in full lines, the dotted lines representing portions of the device to which no claim is made herein.

Fig. 2 is an elevational view of such parts of the cultivator as constitute my invention, with such parts as are old as deemed necessary to make clear the application of my present improvements.

Fig. 3 is an enlarged perspective view showing the means for actuating the movable beams, other portions being removed.

Fig. 4 is a detail in side elevation showing one unit with the operating mechanism, members being shown in cross section.

Fig. 5 is an enlarged detail of the pivot member of the movable beams.

Like numerals of reference indicate like parts throughout the several views.

Figure 6:
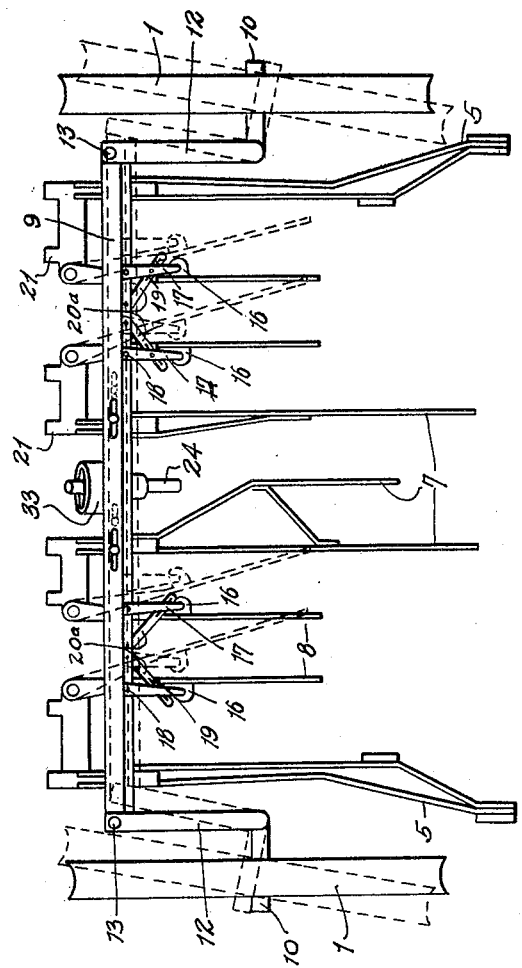
Fig. 6 is a diagrammatic top plan view showing the two positions of the movable beams by full and dotted lines.

Referring to the drawings, 1 designates the wheels; 2 the seat; 3 the tongue; 4 the frame; 5 the fixed beams; 6 the means whereby the gangs may be raised or lowered simultaneously. These parts, however, may be of any well-known or improved construction no claim being made thereto in the present application.

7 are the relatively fixed beams, while 8, 8, are the movable beams mounted for adjustment vertically with the beams 7, but movable laterally independently thereof. The novelty in the present instance, resides principally in the mechanism by which the beams 8 are moved simultaneously with the wheels and independently of the beams 7.

Referring to Figs. 1 and 3, 9 indicates a transverse member mounted for sliding movement. The axle 10 has a vertical extension 11 which terminates in the forwardly extending member 12, which has pivotal connection as at 13 with the end of the member 9 (see Fig. 1). This allows the member 9, the beams 8, and the wheels to move in unison. Lateral movement of the member 9 gives angular movement to the wheels and to the movable beams 8.

Each beam 7 is provided with the lateral member 16 (see Fig. 3) through which is mounted, for vertical movement, a member 17 secured at its upper end in any suitable manner, to the transverse members 9. The upper ends of the members 17 are pivotally mounted as at 18, see Fig. 2, and are provided with projections or the like 20 which are engaged in slots 19 in the members 20ª of such a nature as to permit of adjustment of the members 17 to adjust the rear end of the beams farther apart or closer together as occasion may require.

The forward ends of the beams 8 are pivotally mounted on lateral projections from the axes of the beams 7 so as to move vertically in unison therewith but such forward ends are carried by a knuckle-jointed member 21 (see Fig. 4), so that while the beams 7 and 8 may be moved vertically, simultaneously, the beams 8 are free to have lateral movement on their pivot independently of the adjacent beams. The knuckle joints as well as the members by which they are carried and which carry the forward ends of the beams 8, are mounted upon the lateral extensions of the vertical members 22.

The mechanism for giving the lateral movement to the beams 8 is best shown in Figs. 1, 3 and 4. Referring to Fig. 2, 23 is a bracket supported in any suitable manner from the frame and mounted in said bracket is a shaft 24 carrying thereon a sprocket wheel 25 over which passes a sprocket chain 26 or other suitable ligament, the ends of which are connected as at 27 to the bars 28 and 29, from which depend the pedals 30 and 31. These members 28 and 29 are pivotally mounted at their forward ends so as to be actuated vertically in one direction or the other by pressure of the foot upon the pedal.

The forward end of the shaft 24 is suitably mounted for revolution in a bearing 32 (see Fig. 1) and upon this end of the shaft is a circular member 33 around which passes a chain or other ligament 34, the ends of which are crossed as seen in Fig. 3, and the ends of said member 34 are attached as at 35 and 36 to suitable means on the member 9 as shown clearly in Fig. 3, so that when pressure is applied to one or the other of the pedals 30 or 31, the member 9 will be moved to the right or left, and simultaneously with this movement of the member 9, the wheels and the beams 8 give corresponding movement, while the beams 7 remain stationary. As the front of the wheels are moved outwardly at an angle, say to the right, compared with the frame, the adjacent beams 8 are moved in the same direction, and as pressure is applied upon the other pedal, the wheels are given simultaneous movement at the opposite angle, and the movable beams 8 follow such angularity.

When desired, all of the beams can be raised by manipulation of the lever 6.

In order to provide for taking up slack or regulating the tension of the ligament 34, the members 35, 36 to which the ends thereof are attached after passing around the member 33, the said members are movable in slots 14. Their shanks 37 are screw-threaded as at 38 with their ends passed through the members 39 depending from the member 9 and carry upon their ends nuts 40, as seen in Figs. 2 and 3, so that adjustment of these nuts on the bolts readily take care of any slack in the member 34, and thus proper tension is placed upon the ligament or chain 34 to insure proper location of the shaft 24.

It is to be noted that by manipulation of the shaft 24 by the feet of the operator through the connections above described and shown, the pivotally mounted beams are moved laterally and at the same time the wheels are caused to move therewith, but the relatively fixed beams 5 and 7 do not move, and their original relative positions are not changed, for while each set of beams upon each side of the cultivator may be raised or lowered together with the beams 8, the latter are moved laterally without lateral movement of the beams 5 and 7.

The operation and relative movements of the parts, having been hereinbefore clearly stated, a further description thereof does not seem necessary.

The terms and expressions which I have employed are used as terms of description and not of limitation, but I have no intention in the use of such terms and expressions, of excluding any equivalents of the features shown and described, or portions thereof, but recognize that various modifications are possible within the scope of the invention claimed.

What I claim is:

1. In a cultivator, a frame, a transversely movable member, supporting wheels operatively connected with said member, beams pivotally supported from the frame and connected for movement with said member, a longitudinally disposed shaft supported from the frame, a revoluble member carried by said shaft towards the rear end thereof, foot pedals and connections therewith, the latter cooperable with said revoluble member for simultaneously moving the transversely-movable member and the beams.

2. In a cultivator, a frame, supporting wheels supporting the same, a transverse member, means movable with said member whereby the latter is moved transversely to effect a change of angle of the wheels, beams pivotally supported from the frame and movable transversely of the cultivator with said member, a revoluble shaft extending lengthwise of the machine and supported therefrom, a toothed member carried by said revoluble shaft adjacent the rear end of the latter, foot pedals and a chain connected therewith and cooperable with the toothed member, and a revoluble member operatively connected with said transverse member.

3. In a cultivator, a frame, supporting wheels supporting the same, a transverse member, means movable with said member whereby the latter is moved transversely to effect a change of angle of the wheels, beams pivotally supported from the frame and movable transversely of the cultivator with said member, a revoluble shaft extending lengthwise of the machine and supported therefrom, a toothed member carried by said revoluble member adajcent the rear end of the latter, foot pedals and a chain connected therewith and cooperable with the toothed member, and a revoluble member carried by said shaft, and a ligament carried by the last named revoluble member and operatively connected with said transverse member.

4. In a cultivator, a frame, supporting wheels supporting the same, a transverse member, means movable with said member whereby the latter is moved transversely to effect a change of angle of the wheels, beams pivotally supported from the frame and movable transversely of the cultivator with said member, a revoluble shaft extending lengthwise of the machine and supported therefrom, a toothed member carried by said revoluble member adjacent the rear end of the latter, foot pedals and a chain connected therewith and cooperable with the toothed member, and a revoluble member carried by said shaft, and a ligament carried by the last named revoluble member and operatively connected with said transverse member, and provisions for adjustment of said ligament.

5. In a cultivator, a frame, supporting wheels therefor, a transversely movable member, pivotally mounted beams movable with said member, a longitudinally extended shaft supported beneath the frame, a member revoluble with the shaft near the front end thereof, a ligament cooperable with said revoluble member and with the transversely movable member, and means towards the rear of said shaft for revolving the same to reciprocate the transversely movable member.

6. In a cultivator, a frame, supporting wheels therefor, a transversely movable member, pivotally mounted beams movable with said member, a longitudinally extended shaft supported beneath the frame, a member revoluble with the shaft near the front end thereof, a ligament cooperable with said revoluble member and with the transversely movable member, means towards the rear of said shaft for revolving the same to reciprocate the transversely movable member, said last-named means comprising a toothed member on said shaft, foot pedals and a chain having its ends connected therewith, said chain cooperable with said toothed member.

7. In a cultivator, a frame, a transversely movable member thereon, pivotally mounted beams movable with said member, a longitudinally disposed shaft, a member on said shaft toward the front end thereof, a ligament connected with said member and means for tensioning the ends of said ligament, and means toward the rear of the device for operating said shaft to rotate it and simultaneously actuate said transversely-movable member.

8. In a cultivator, a frame, a transversely movable member thereon, pivotally mounted beams movable with said member, a longitudinally disposed shaft, a member on said shaft toward the front end thereof, a ligament connected with said member and means for tensioning the ends of said ligament, means toward the rear of the device for operating said shaft, said means comprising a toothed member cast on the shaft, a chain cooperable with said toothed member, and oppositely movable foot pedals to which the ends of said chain are connected and a rotatable member on the front end of said shaft and means operable therewith for moving said beams on their pivot.

In testimony whereof I affix my signature.
HENRY PETERSEN.